UNITED STATES PATENT OFFICE.

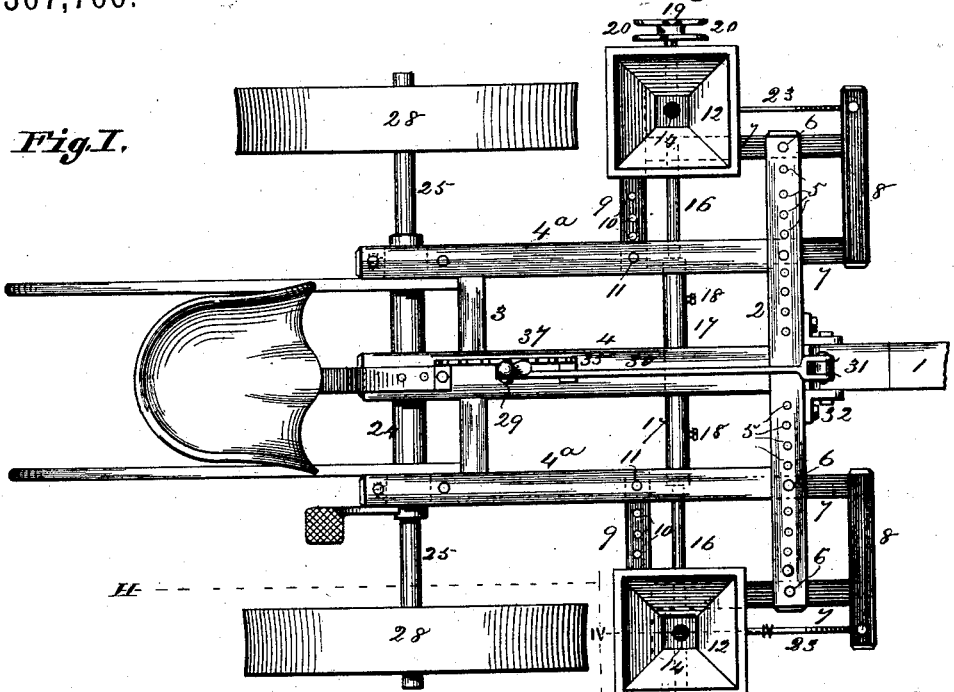

HIRAM ROBBINS, OF LITTLE ROCK, ARKANSAS.

COTTON-PLANTER.

SPECIFICATION forming part of Letters Patent No. 367,766, dated August 2, 1887.

Application filed February 28, 1887. Serial No. 229,216. (No model.)

*To all whom it may concern:*

Be it known that I, HIRAM ROBBINS, of Little Rock, in the county of Pulaski and State of Arkansas, have invented a certain new and useful Improvement in Cotton-Planters, of which the following is a full, clear, and exact description, reference being had to the accompanying drawings, forming part of this specification, and in which—

Figure I is a top view of a machine embodying my invention. Fig. II is a longitudinal section at II II, Fig. I. Fig. III is a detail side view of the sprocket-wheel, showing a short piece of the check-row cord. Fig. IV is a detail sectional view on the line IV IV, Fig. I. Fig. V is a detail rear view of the central part of the axle, part in section.

This is a cotton-planter in which the dropping mechanism is actuated by buttons on a check-row wire, cord, or cable, which causes the seed-wheels to turn, owing to the forward movement of the machine.

The seed boxes and wheels are made transversely adjustable to enable the machine to be used in planting rows of different distances asunder.

The tongue 1 is jointed to a central longitudinal bar, 4, of a main frame composed of said central longitudinal bar, 4, side longitudinal bars, 4ª, and front and rear cross-bars, 2 and 3. The cross-bar 2 has two series of vertical bolt-holes, 5, extending from the central bar toward the ends of the cross-bar, for bolts 6, by which the seed-box frames are connected to it. The seed-box frames have each a pair of longitudinal bars, 7, and front and rear cross-bars, 8 and 9. The cross-bar 9 has a number of vertical holes, 10, through which passes a bolt, 11, which also passes through one of the longitudinal side bars, 4ª, of the main frame. It will be seen that by passing the bolts 6 and 11 through others of the holes 5 and 10 the frames may be adjusted so as to bring the seed boxes 12 nearer together.

In the lower parts of the seed-boxes are the feed-wheels 13. These feed-wheels have seed-cavities 14, one of which is shown open to the cavity of the feed-box and another open to the spout 15. The feed-wheel is upon a shaft composed of two solid parts, 16, and a central sleeve, 17, forming a tube in which the ends of the parts 16 are telescoped and in which they are held by set-screws 18.

It will be seen that the feed-wheels being on the same shaft will turn together, so that an actuating device on one end (or other part of the shaft) will turn both wheels.

The actuating device consists of a wheel, 19, having forked arms 20, which embrace the check-row wire, cord, cable, or chain 21. This wire 21 has buttons 22, which as the machine is drawn forward engage the arms 20 and turn the wheel 19 and the feed-wheels 13 one-fourth around, and thus carry another of the seed-cavities on each feed-wheel to its lower position, so that the contents drop into the spout 15 and into the furrow at the rear of the plow or furrow-opener 23.

The axle is, like the shaft, composed of a central sleeve or tubular part, 24, and two solid parts or end portions, 25, and is fixed to the frame by means of its central tubular part, 24. The end portions, 25, are telescoped into the tubular part and are held in position therein by set-screws, 26, which pass through the brackets 27, by which the part 24 is held, through the part 24, and bear against the parts 25. The brackets 27 are secured to the longitudinal bars. The wheels 28 turn freely on the parts 25.

It will be understood that the wheels follow directly in the furrows into which the seed has been dropped, and their concave rims compress the earth upon the seeds.

29 is a hand-lever, fulcrumed to the central bar, 4, of the frame and connected by a rod, 30, to a standard, 31, firmly fixed to the tongue near the joint 32, by which the tongue is jointed to the longitudinal central bar, 4.

It will be seen that when the free end of the lever is moved backward the front end of the main frame 2 3 4 is raised, and with the frame the furrow-opener, so that it penetrates the earth to a less depth. A forward movement of the lever has, of course, a contrary effect. The lever is held in the proper position by a drop-catch, 33, which engages in one of the notches 34 of a bar, 35. The catch is lifted by the usual rod, 36, and small lever 37 upon the main lever 29.

The cotton-seed is always covered with a quantity of short cotton lint, which adheres fast to the seed, and which renders it necessary that the seed af each dropping should be separated from the mass in the seed-box by a positive operation, which will forcibly separate the seeds from the mass at the proper time and carry them to the discharge-spout. This is accomplished by the check-row wire with the sprocket-wheel, shaft, and feed-wheel in a way which could not be done by any dropping device actuated by the ground-wheels, because the resistance of the cotton-seed to the feed-wheel would cause the wheels to slip at times, and thus the dropping would be irregular and the hills would be out of place.

I claim as my invention—

1. The combination of the central longitudinal bar, 4, the side longitudinal bars, 4ᵃ, the central sleeve, 17, extending across the bars, the shafts 16, journaled in the central sleeve, provided with feed-wheels 13, having seed-cavities 14, and wheels 19, having forked arms 20, the seed-boxes 12, having suitable frames, spouts 15, and openers 23, substantially as described.

2. The combination of the central longitudinal bar, 4, the side longitudinal bars, 4ᵃ, the central sleeve, 17, extending across the bars, the adjustable shafts 16, journaled in the central sleeve, provided with feed-wheels 13 and wheels 19, the cross-bar 3, the cross-bar 2, having series of bolt-holes 5, and the seed-boxes and frames, each seed-box frame having longitudinal bars 7, cross-bar 8, and cross-bar 9, having a series of bolt-holes, 10, substantially as described.

3. The combination of the central longitudinal bar, 4, the side longitudinal bars, 4ᵃ, the central sleeve, 17, extending across the bars, the shafts 16, journaled in the central sleeve, provided with feed-wheels, seed-box having frames, front cross-bar, 2, rear cross-bar, tubular part 24, extending across the longitudinal bars, and the axles 25, journaled in the tubular part, having furrow-closing wheels 28, substantially as described.

4. The combination of the central longitudinal bar, 4, the side longitudinal bars, 4ᵃ, the front perforated cross-bar, 2, the rear cross-bar, 3, the central sleeve, 17, extending across the longitudinal bars in rear of the front cross-bar, the tubular part 24, extending across the longitudinal bars in rear of the rear cross-bar, the shafts 16, having feed-wheels, the seed-boxes, the frames supporting the seed-boxes having longitudinal bars 7, front cross-bar, 8, and perforated rear cross-bar, 9, the axles 25, the furrow-closing wheels 28, furrow-openers 23, and seed-spouts 15, substantially as described.

5. The combination of the main frame comprising the central longitudinal bar, 4, the side longitudinal bars, 4ᵃ, the front cross-bar, 2, the rear cross-bar, 3, and the tongue 1, jointed to the central longitudinal bar, having standard 31, the bar 35, having notches, the hand-lever 29, carrying small lever 37 and rod 36, and the rod 30, connecting the lever with the standard, substantially as described.

HIRAM ROBBINS.

Witnesses:
FRED ROSSNER,
FRANK BOTSFORD.